United States Patent
Sugiyama et al.

(10) Patent No.: US 8,353,226 B2
(45) Date of Patent: Jan. 15, 2013

(54) VEHICLE SHIFT LEVER SYSTEM AND METHOD

(75) Inventors: Takashi Sugiyama, Dublin, OH (US); Alan Cheung, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1122 days.

(21) Appl. No.: 12/051,408

(22) Filed: Mar. 19, 2008

(65) Prior Publication Data

US 2009/0165590 A1    Jul. 2, 2009

Related U.S. Application Data

(60) Provisional application No. 61/017,933, filed on Dec. 31, 2007.

(51) Int. Cl.
*B60K 20/00* (2006.01)

(52) U.S. Cl. .................................. 74/473.18

(58) Field of Classification Search ............ 74/473.1, 74/473.12, 473.18, 473.21, 473.3, 469, 490
See application file for complete search history.

(56) References Cited

U.S. PATENT DOCUMENTS

| | | | |
|---|---|---|---|
| 1,487,380 A | 3/1924 | Harris | |
| 2,478,356 A | 8/1949 | Auten | |
| 2,552,005 A | 5/1951 | Fike | |
| 2,800,800 A | 7/1957 | Dunn | |
| 3,214,994 A | 11/1965 | Tolan, Jr. | |
| 3,216,274 A | 11/1965 | Hurst, Jr. et al. | |
| 3,657,943 A | 4/1972 | Bruhn, Jr. et al. | |
| 4,566,349 A | 1/1986 | Van der Loon et al. | |
| 5,579,661 A | 12/1996 | Yarnell et al. | |
| 5,768,944 A | 6/1998 | Inuzuka et al. | |
| 5,899,115 A | 5/1999 | Kataumi et al. | |
| 6,857,335 B2 | 2/2005 | Kahara | |
| 7,467,570 B2 * | 12/2008 | Wang | 74/566 |
| 7,536,972 B2 * | 5/2009 | Suzuki et al. | 116/28.1 |
| 7,722,102 B2 * | 5/2010 | Hansen et al. | 296/24.34 |
| 7,891,267 B2 * | 2/2011 | Aso et al. | 74/473.18 |
| 2005/0000310 A1 * | 1/2005 | Yamamoto et al. | 74/473.18 |

* cited by examiner

*Primary Examiner* — Michael P Ferguson
*Assistant Examiner* — Daniel Wiley
(74) *Attorney, Agent, or Firm* — Kenealy Vaidya LLP; Mark E. Duell

(57) ABSTRACT

A shift lever assembly for a vehicle transmission can include an escutcheon body having a first guide rail and a second guide rail where the first and second guide rails are spaced apart from each other and are substantially parallel to each other. A slider body can be provided and can be movable with respect to the escutcheon body and include at least one spring member. The at least one spring member can include a contact structure, and a compression force can be applied via the contact structure to maintain the contact structure in compression with the guide rails.

11 Claims, 3 Drawing Sheets

VEHICLE SHIFT LEVER SYSTEM AND METHOD

This application and invention claims the priority benefit under 35 U.S.C. §119 of U.S. Provisional Patent Application No. 61/017,933 filed on Dec. 31, 2007, which is hereby incorporated in its entirety by reference.

BACKGROUND

1. Field

The presently disclosed subject matter relates to shift levers for vehicle transmissions and, more particularly, to a system and method for reducing or eliminating vibration and/or rattling in the shift lever assembly of a vehicle transmission.

2. Brief Description of the Related Art

In most vehicles, a transmission assembly is provided in the drive train between the engine and the driven wheels. A transmission assembly typically includes a plurality of gears which are selectively engaged to provide various speed reduction gear ratios between the input and the output of the transmission. A control member within the transmission is moved (automatically in an automatic transmission) through a plurality of gear ratio positions for selecting the desired speed reduction. As a result, acceleration and deceleration of the vehicle can be achieved in a smooth and efficient manner.

The control member that is located within the vehicle is typically configured as a gear shift or automatic shift lever type structure. An escutcheon body (also referred to as an ESCN body) can be provided to house or at least cover a portion of the gears, linkage, and/or other components of the gear shifter. A slider body is typically formed over the escutcheon body and includes the above-noted shift lever type structure which can be displaced by a driver to change the transmission settings. In one type of automatic transmission, the shift lever is coupled to a lower member which moves within the gear shifter. Thus, when the shift lever is displaced, the slider body moves over the escutcheon body and the lower member engages the transmission components so that the transmission settings are changed. An escutcheon cover may be formed over both the escutcheon body and the slider body to seal and/or cover the components of the transmission assembly.

The escutcheon body typically includes a guide rail on which a portion of the slider body rides when the shift lever is moved. There can be a small gap between the slider body and the escutcheon guide rail to prevent shift load increases due to friction and to generally allow the shift lever to slide freely into various positions.

When the vehicle is operated, the transmission and other components of the drive train of the vehicle vibrate to a certain extent. In addition, vibrations are generated by the vehicle engine itself during operation, and due to operation/actuation of the lever itself. The gap interface between the slider body and the escutcheon body sometimes creates additional rattling and/or squeak noises. These vibrations can possibly be sensed by the vehicle driver in some circumstances and are deemed undesirable noise. To reduce the amount of this undesirable noise, the driver compartment of the vehicle can be lined with acoustical insulating material. However, the vibration and/or rattling at the interface of the escutcheon body and the shift body may still be transmitted through the shift lever and into the driver compartment, thus defeating the acoustical insulation.

Thus, it would be desirable to provide a transmission assembly and shift lever system that is inexpensive in construction and which reduces and/or eliminates the rattling caused at the interface of the escutcheon body and the slider.

SUMMARY

The disclosed subject matter addresses at least some of the drawbacks in the conventional transmission assemblies described above by providing a shift lever assembly that reduces and/or eliminates rattling and squeaking caused by vehicle vibration and/or actuation of the shift lever assembly. The transmission assembly and shift assembly according to the disclosed subject matter can provide a light weight, low cost solution that can be implemented in a variety of vehicle transmission systems. According to an aspect of the disclosed subject matter, a shift lever assembly for a vehicle transmission can include an escutcheon body including a first guide rail and a second guide rail, the first and second guide rails spaced apart from each other and substantially parallel to each other; and a slider body including at least one spring member, the at least one spring member including at least one contact structure, wherein the at least one contact structure is maintained in compression with at least one of the first and second guide rails.

According to another aspect of the disclosed subject matter, a shift lever assembly for a vehicle transmission can include an escutcheon body including at least one guide rail having a first surface. A shift lever can be located adjacent the escutcheon body and configured to move relative to the escutcheon body. A slider body can be configured to move with respect to the escutcheon body, the slider body including at least one spring member having at least one contact structure, wherein the at least one spring member is configured to apply a substantially continuous compression force between the contact structure of the slider body and the first surface of the guide rail such that the contact structure is maintained in contact with the first surface during movement of the shift lever relative to the escutcheon body.

According to another aspect of the disclosed subject matter, a shift lever assembly for a vehicle transmission can include a shift lever. A first body can be located adjacent the shift lever and having a first edge and a second edge and an opening through which the shift lever extends, the first edge substantially parallel to the second edge, the first edge having a first guide rail and the second edge having a second guide rail, and the first body configured to cover vehicle transmission components. A second body can be located adjacent the shift lever and having a first side edge and a second side edge and an opening through which the shift lever extends, the first side edge being substantially parallel to the second side edge, the first side edge having a first spring member, the second side edge having a second spring member, the second body configured to be movable with respect to the first body. The first spring member can have a first extension body extending in a direction substantially parallel to the first side edge of the second body and the second spring member has a second extension body extending in a direction substantially parallel to the second side edge of the second body, and the first spring member can include a contact that engages the first guide rail of the first body and the second spring member can include a contact that engages the second guide rail of the first body.

According to yet another aspect of the disclosed subject matter, a shift lever assembly for a vehicle transmission can include an escutcheon body having an upper surface, the escutcheon body including at least one guide rail having a lower surface. A shift lever can be located adjacent the escutcheon body and configured to move relative to the escutcheon body. A slider body can include a bottom surface and an opposed contact structure configured to contact the lower surface of the at least one guide rail of the escutcheon body, the slider body configured to move relative to the escutcheon body. The slider body can also include means for continuously applying a compression force between the contact structure of the slider body and the lower surface of the guide rail such that the contact structure is maintained in contact with the lower surface during movement of the shift lever relative to the escutcheon body and such that the bottom surface of the slider body is biased towards the upper surface of the escutcheon body.

According to another aspect of the disclosed subject matter, the slider body includes a first row of spring members and a second row of spring members, the first row of spring members formed adjacent the first guide rail and the second row of shift members formed adjacent the second guide rail.

According to still another aspect of the disclosed subject matter, each of the spring members includes a contact structure and the contact structures formed along the first row of spring members ride along the first guide rail and the contact structures formed along the second row of spring members ride along the second guide rail.

According to another embodiment of the disclosed subject matter, at least one spring member is formed as a flexible guide leg a contact structure is formed on a distal end of the flexible guide leg.

According to still another embodiment of the disclosed subject matter, a method for reducing vibration transmission in a vehicle shifter lever assembly can include providing an escutcheon body including at least one guide rail having a first surface, a shift lever located adjacent the escutcheon body and configured to move relative to the escutcheon body, and providing a slider body located adjacent and configured for movement with respect to the escutcheon body, the slider body including at least one contact structure configured to contact the first surface of the at least one guide rail of the escutcheon body during movement of the slider body with respect to the escutcheon body, the slider body including an adjacent portion and an intermediate portion, the intermediate portion located between the contact structure and the adjacent portion. The method can include moving the contact structure of the slider body relative to the adjacent portion of the slider body such that the intermediate portion of the slider body elastically deforms and provides a compression force between the contact structure and the first surface of the at least one guide rail during movement of the shift lever relative to the escutcheon body.

Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
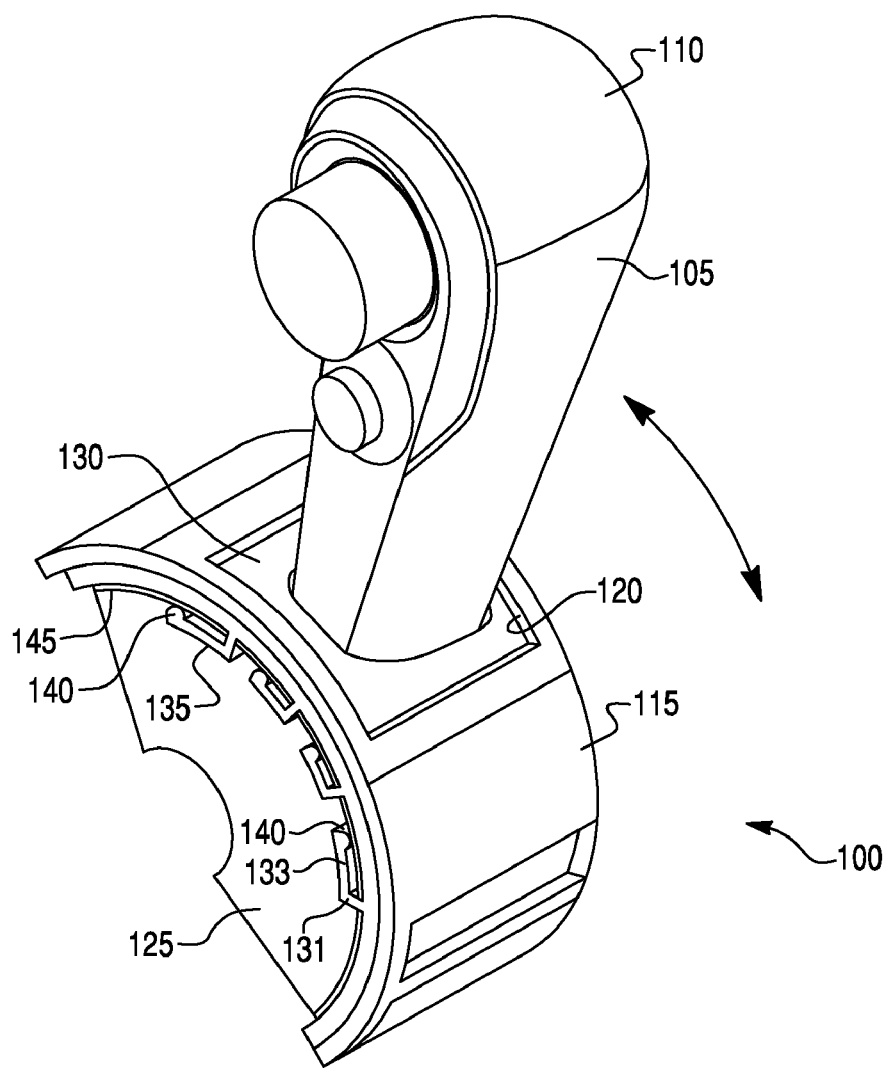
FIG. 1 illustrates a perspective view of an exemplary embodiment of a vehicle shift lever system in accordance with the principles of the disclosed subject matter.

The disclosed subject matter provides a vehicle shift lever system and method for use with a transmission assembly that minimizes transmission of rattling, vibration, and/or noise caused by actuation of the shift lever and/or due to typical vehicle vibration. The system according to the disclosed embodiments may be employed in conventional transmission systems.

Referring to the drawing figures, like reference numerals designate identical or corresponding elements throughout the several figures.

FIG. 1 illustrates a perspective view of an exemplary embodiment of a shift lever assembly 100 according to the principles of the disclosed subject matter. FIG. 1 shows the shift lever assembly 100 including a shift lever 105 having a shift knob 110. A slider body 130 can be located immediately adjacent and, if necessary, in contact with the shift lever. The slider body 130 can be configured to move with the shift lever 105 as the shift lever 105 is actuated. An escutcheon body 125 can be provided which may be mounted to the frame of the vehicle or other portions of the interior of the vehicle. The escutcheon body 125 can be shaped and configured to finish or hide the connection between the shift lever 105 and the vehicle cabin and can provide the vehicle with a uniform, aesthetic and/or other designed vehicle interior quality. The escutcheon body 125 also includes a pair of guide rails 145 that can each be located at a respective one of the edges 127 of the escutcheon body 125. An escutcheon cover 115 can be provided to cover the escutcheon body 125 and a portion of the slider body 130 and to further finish the interior of the vehicle and hide transmission and shift lever components. An escutcheon cover opening 120 can be provided in the escutcheon cover 115 such that the shift lever can move between its various shift lever positions (e.g., park, reverse, neutral, drive, low gears, etc.). The slider body 130 can also include a plurality of spring members 135 each having a contact structure 140. The spring members 135 can be located along a first edge 137 of the slider body 130 and along a second edge 137 of the slider body 130. As shown more clearly in FIG. 5, the spring members 135 can each include a first portion 131 that extends perpendicularly from the bottom surface 138 of the slider body 130 and also extends downward from the edge 137 of the slider body 130. The spring member 135 can include a second portion 133 extending substantially perpendicularly from the first portion 131. The second portion 133 can run substantially parallel with the edge 137 and bottom surface 138 of the slider body 130. The contact structure 140 can be located at an end of the second portion 133 and can extend inward towards a central portion 139 of the slider body 130 such that the contact structure 140 extends underneath a guide rail 145 of the escutcheon body 125 to sandwich the escutcheon body 125 between the contact structure 140 and the bottom surface 138 of the slider body 130. The guide rail 145 can include an upper surface 145a and an opposed lower surface 145b. In the embodiment shown, the lower surface 145b of the guide rail 145 is in contact with the contact structure 140 of the slider body 130.

The first portion 131 and second portion 133 of the spring member 135 are configured such that they can be elastically deformed and flex relative to the bottom surface 138 and/or central portion 139 of the slider body 130. Thus, the spring members 135 are configured to be flexed by/against the guide rail 145 and apply a compressive force against the guide rails 145 to bias the slider body 130 towards the escutcheon body 125. This compressive force can be applied throughout the motion of the slider body 130 relative to the escutcheon body 125 such that actuation of the shift lever 105 can be accomplished with little noise and/or vibration, and transmission of other vibration through the shift lever assembly 100 is also reduced.

In operation, a vehicle operator shifts the shift lever 105 in either direction shown by the arrow in FIG. 1 in order to change the transmission settings. In the embodiment shown in FIG. 1, shifting the shift lever 105 will also move the slider body 130 along the escutcheon body 125. The spring members 135 move as the slider body 130 moves, and the contact structures 140 also move with the slider body 130. The contact structures 140 are configured to be compressed against the guide rail 145 and they ride along the guide rail 145 as the shift lever is moved. The contact structures 140 firmly contact and/or grip the guide rails 145 so that the slider body 130 is maintained firmly in contact or at least biased towards the escutcheon body 125 without increasing shift load so as to control any looseness of the slider body 130 so that rattling is reduced and possibly eliminated.

In one embodiment of the disclosed subject matter, as shown in FIG. 1, the spring members 135 are formed as flexible guide legs. The contact structures 140 are formed on a distal end of the flexible guide legs as elongate members with rounded top surfaces to minimize the contact area and yet provide the spring/compression force for biasing the slider body 130 towards the escutcheon body 125.

Figure 2:
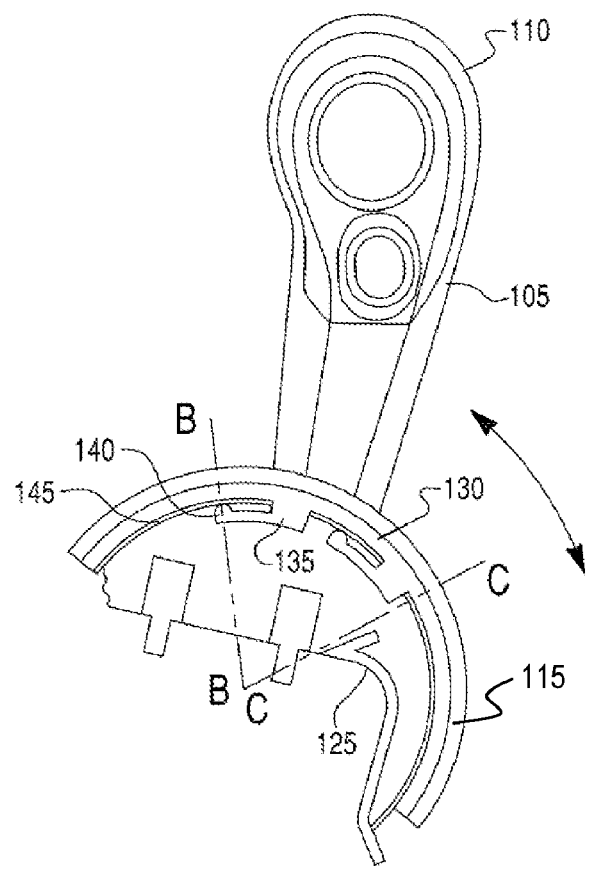
FIG. 2 shows aside view of the vehicle shift lever system of FIG.1.

FIG. 2 is a side view of the shift lever assembly 100 shown in FIG. 1. The shift lever 105 and the shift knob 110 are moved as shown when the operator switches gears in the transmission. The movement of the shift lever 105 causes the slider body 130 to move with the shift lever 105 which results in a uniform appearance, and provides a continuous cover over any gap that would otherwise be located between the shift lever 105 and the vehicle interior and, in this case, the escutcheon body 125. The escutcheon body 125 is mounted to the frame or other structure of the vehicle and includes guide rails 145 that can be semi-arcuate and follow the contour of the bottom surface 138 of the slider body 130. The slider body 130 includes the plurality of spring members 135 each having contact structures 140. The contact structures 140 are compressed against the guide rails 145 so that the slider body 130 is maintained firmly in contact with the escutcheon body 125 during relative movement and/or sliding so that rattling is prevented of these structures with each other is prevented.

In operation, a vehicle operator will shift the shift lever 105 in the directions shown by the arrow in FIG. 2. Shifting the shift lever 105 causes the slider body 130 to move over the escutcheon body 125. The spring members 135 also move as the slider body 130 moves. The contact structures 140 also move along as the slider body 130 moves. The contact structures 140 can be continuously compressed against the guide rail 145, riding along the guide rail 145 as the shift lever 105 is moved. Thus, the contact structures 140 allow the slider body 130 to be maintained firmly in contact with the escutcheon body 125 without increasing shift load so as to control looseness of the slider body 130 so that rattling, vibration, etc., is/are reduced and even eliminated.

Figure 3:
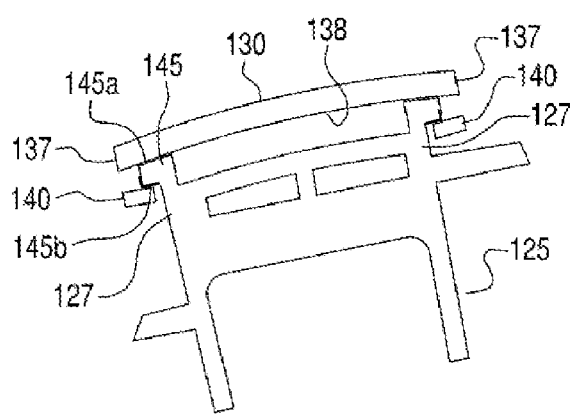
FIG. 3 shows a cross-sectional view of the vehicle shift lever system taken along line B-B of FIG. 2.

FIG. 3 shows a close-in cross section view of the shift lever assembly 100 taken along section line B-B of FIG. 2. The slider body 130 includes contact structures 140 which are parallel to each other and which extend underneath the guide rail 145 to sandwich the guide rail 145 of the escutcheon body 125 between the bottom surface 138 of the slider body 130 and the contact structures 140 located on the spring members 135 of the slider body 130. The slider body 130 is positioned over the escutcheon body 125 and rides or slides over the top of the escutcheon body 125 during shifting operations. When the slider body 130 is moved during operation and the contact structures 140 ride along the guide rails 145, the slider body 130 is firmly held in place with respect to the escutcheon body 125 so as to reduce and/or eliminate rattling, etc., between the escutcheon body 125 and slider body 130. Furthermore, vibration from the engine, transmission, and other components of the vehicle can be prevented from traveling into the interior of the vehicle by the above-described structural arrangement between the slider body 130 and escutcheon body 125. Additionally, the contact structures 140 are compressed firmly against the guide rails 145 so that there is little or no space between the contact structures 140 and the guide rails 145 throughout operation of the shift lever assembly 100. The escutcheon body 125 can be secured to the frame of the vehicle or other structure located within the vehicle interior. Thus, the slider body 130 moves relative to the vehicle interior and is the structure that will appear to move with movement of the shift lever 105.

Figure 4:
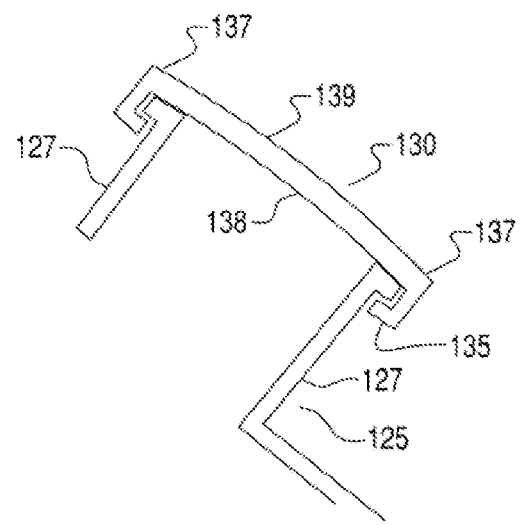
FIG. 4 shows a cross-sectional view of the vehicle shift lever system taken along line C-C of FIG. 2.

FIG. 4 shows a close-in cross-sectional view of the shift assembly taken along line C-C of FIG. 2. FIG. 4 shows the slider body 130 which includes spring members 135. The slider body 130 is positioned over the escutcheon body 125 so that the spring members 135 move along the escutcheon body 125 as the slider body 130 is moved. The portion of the spring members 135 shown in FIG. 4 is adjacent to but not in contact with the guide rails 145. As described above, the contact structures 140 (not shown in FIG. 4) are located at distal ends of the spring members 135, and these contact structures 140 ride along and compress the guide rails 145.

Figure 5:
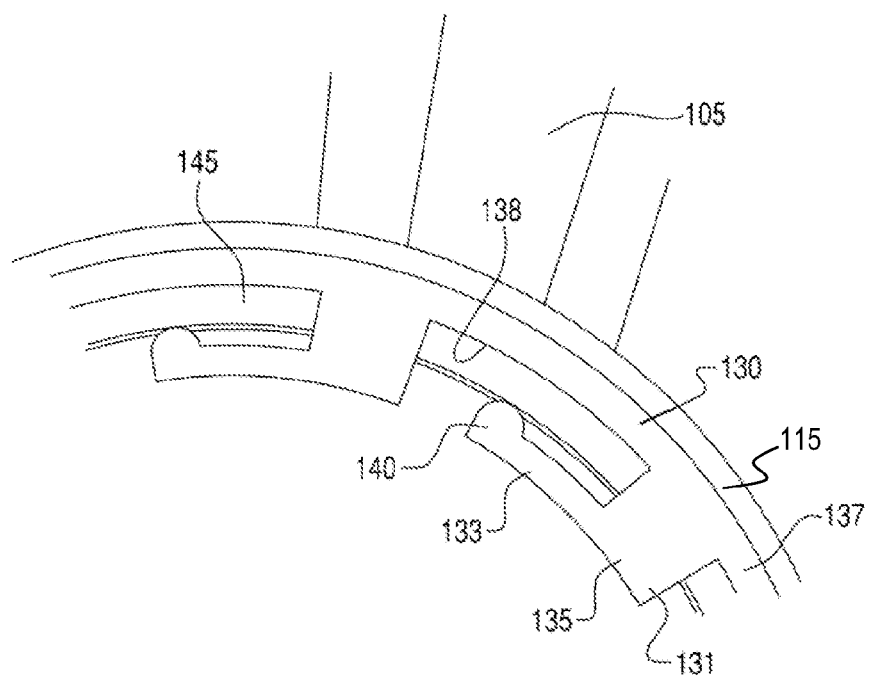
FIG. 5 is a close in side view of the vehicle shift lever system of FIG. 1.

FIG. 5 shows a close-in view of the shift assembly according to an embodiment of the disclosed subject matter. FIG. 5 shows the shift lever 105 which can be moved by an operator of the vehicle. The shift lever 105 is coupled to the slider body 130 either integrally or by contact, and causes the slider body 130 to move as the shift lever 105 is moved. The slider body 130 includes the spring members 135 which move as the slider body 130 moves. Contact structures 140 are disposed at ends of the spring members 135 and are in contact with and ride along the guide rails 145 as the slider body 130 moves. The guide rail 145 is disposed on the escutcheon body 125. In the embodiment of FIG. 5, the spring members 135 are formed as flexible guide legs which extend in a direction of the guide rails. The contact structures 140 are located at a distal end of the spring members 135 and extend inwardly to sandwich the guide rail 145 as described above.

It should be noted that several of the disclosed structures that make up the shift assembly 100 can be varied in terms of shape, size, material, connections, etc., without departing from the spirit and scope of the presently disclosed subject matter. For example, the spring members 135 could be other structures which are capable of exerting a compressive force on the guide rails 145, such as a coil spring device, a leaf spring, a top side spring, etc. It should also be understood that the configuration of the contact structures, spring members and guide rails could be inverted. For example, in an alternate embodiment, the escutcheon body 125 could be configured to include the contact structures 140 and spring members 135, while the slider body could 130 be configured to include the guide rails 145. The physical architectural design of the spring members 135 can also vary widely depending on many factors, including the space in which the shift lever assembly is being installed, the amount of spring force desired, etc. For example, the second portion 133 of the spring members 135 could be arcuately curved and still provide the elasticity for compressing the contact structure 140 against the guide rail 145. Additional or different extension portions can be included in the spring members 135, and each of the spring members 135 is not required to be identically shaped or composed. A single rail 145 instead of the disclosed double rail 145 structure is also contemplated as falling within the scope of the disclosed subject matter. Additionally, although the slider body 130 and escutcheon body 125 are shown as having mating and generally arcuate structural shapes in side view, these structures could be formed in parallel planes or in other shapes and can include various different structures located therebetween or thereon. For example, a lighted transmission gear indicator could be built into one or both of the escutcheon body 125 and slider body 130.

The shifter assembly could also be used in a manual transmission shifter by including additional slider body or bodies and/or including other escutcheon plates or bodies that would allow side to side movement of the shifter 105 relative to the longitudinal axis of the slider body 130 and escutcheon body 125. Thus, the slider body 130 and the escutcheon body could be formed in multiple parts for a manual transmission application of the disclosed subject matter or for other applications in automatic transmission assemblies.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of any of the aforementioned conventional art documents is incorporated by reference herein.

What is claimed is:

1. A shift lever assembly for a vehicle transmission, comprising:
    an escutcheon body including an opening formed on an outer surface thereof, and at least one guide rail extending substantially parallel to the outer surface, wherein the at least one guide rail has an upper surface, a lower surface facing a direction opposite to the upper surface, and an edge surface connecting the upper surface to the lower surface;
    a shift lever extending outwardly though the opening in the escutcheon body, the shift lever including an upper portion having a shift knob, and a lower portion opposite the upper portion and connected to and within the escutcheon body, wherein the shift lever is configured to move relative to the escutcheon body within the opening in the escutcheon body; and
    a slider body coupled with the shift lever, the slider body including a bottom surface configured to slide along the upper surface of the at least one guide rail, the slider body further including at least one spring member extending toward the escutcheon body and around the edge surface of the at least one guide rail, and having at least one contact structure extending toward the lower surface of the at least one guide rail, wherein the at least one spring member presses the contact structure towards the lower surface of the guide rail such that the contact structure is maintained in contact with the lower surface of the at least one guide rail and the bottom surface of the slider body is maintained in contact with the upper surface of the at least one guide rail during movement of the shift lever relative to the escutcheon body.

2. The shift lever assembly for a vehicle transmission according to claim 1, wherein the escutcheon body includes a second guide rail, the first guide rail being spaced apart and substantially parallel with respect to the second guide rail.

3. The shift lever assembly for a vehicle transmission according to claim 2, wherein the slider body includes a first row of spring members and a second row of spring members, the first row of spring members formed adjacent the first guide rail and the second row of spring members formed adjacent the second guide rail.

4. The shift lever assembly for a vehicle transmission according to claim 3, wherein each of the spring members includes a contact structure, and wherein the contact structures formed along the first row of spring members are configured to ride along the lower surface of the guide rail, and the contact structures formed along the second row of spring members are configured to ride along a first surface of the second guide rail.

5. The shift lever assembly for a vehicle transmission according to claim 1, wherein the at least one spring member includes a flexible guide leg and the at least one contact structure is formed at a distal end of the flexible guide leg.

6. The shift lever assembly for a vehicle transmission according to claim 1, wherein the at least one guide rail is sandwiched between the bottom surface of the slider body and the contact structure.

7. The shift lever assembly for a vehicle transmission according to claim 1, further comprising:
    an escutcheon cover assembly located adjacent the slider body and the escutcheon body.

8. The shift lever assembly for a vehicle transmission according to claim 1, wherein the slider body includes a rigid body portion and the spring member includes an elastic portion that extends from the rigid body portion such that the contact structure can be moved relative to the rigid body portion to cause a compressive elastic return spring force at the contact structure when the contact structure is in contact with lower surface of the guide rail.

9. The shift lever assembly for a vehicle transmission according to claim 1, wherein the contact structure has a thickness measured in a direction that is substantially perpendicular to the edge surface of the at least one guide rail that is greater than a thickness measured in the direction that is substantially parallel to the edge surface of the at least one guide rail.

10. The shift lever assembly for a vehicle transmission according to claim 1, wherein the upper surface of the at least one guide rail is defined by a radius of curvature and the lower surface of the at least one guide rail is substantially parallel to the upper surface of the at least one guide rail.

11. A method for reducing vibration transmission in a vehicle shifter lever assembly, comprising:
    providing an escutcheon body including an opening formed along an outer surface thereof, and at least one guide rail extending substantially parallel to the outer surface, wherein the at least one guide rail has an upper surface, a lower surface facing a direction opposite to the upper surface, and an edge surface connecting the upper surface to the lower surface;

providing a shift lever extending outwardly though the opening in the escutcheon body, the shift lever including an upper portion having a shift knob, a lower portion opposite the upper portion and connected to and within the escutcheon body, and a longitudinal axis, wherein the shift lever is configured to move relative to the escutcheon body within the opening in the escutcheon body;

orienting the shift lever relative to the escutcheon body such that the lower surface faces away from the shift knob of the shift lever;

providing a slider body coupled with the shift lever, the slider body including a bottom surface configured to slide along the upper surface of the at least one guide rail, the slider body further including at least one spring member extending toward the escutcheon body and around the edge surface of the at least one guide rail, and having at least one contact structure pressed by the at least one spring member to contact the lower surface of the at least one guide rail of the escutcheon body and the bottom surface of the slider body is maintained in contact with the upper surface of the at least one guide rail during movement of the slider body with respect to the escutcheon body.

\* \* \* \* \*